(12) United States Patent
Okamoto et al.

(10) Patent No.: US 9,225,103 B2
(45) Date of Patent: Dec. 29, 2015

(54) CONNECTOR

(75) Inventors: Kenichi Okamoto, Shizuoka (JP); Yuu Nanami, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 45 days.

(21) Appl. No.: 14/122,310

(22) PCT Filed: May 25, 2012 (Under 37 CFR 1.47)

(86) PCT No.: PCT/JP2012/003417
§ 371 (c)(1),
(2), (4) Date: May 27, 2014

(87) PCT Pub. No.: WO2012/164887
PCT Pub. Date: Dec. 6, 2012

(65) Prior Publication Data
US 2014/0377978 A1    Dec. 25, 2014

(30) Foreign Application Priority Data
Jun. 2, 2011   (JP) .................. 2011-124047

(51) Int. Cl.
H01R 13/52 (2006.01)
B60L 3/00 (2006.01)
H01R 13/639 (2006.01)
H01R 105/00 (2006.01)

(52) U.S. Cl.
CPC .......... *H01R 13/5202* (2013.01); *B60L 3/0069* (2013.01); *H01R 13/5213* (2013.01); *H01R 13/639* (2013.01); *H01R 2105/00* (2013.01)

(58) Field of Classification Search
CPC .................................................. H01R 13/5202
See application file for complete search history.

(56) References Cited

U.S. PATENT DOCUMENTS

| 5,025,553 | A  | * | 6/1991  | Telco ............................. 29/852 |
| 5,551,892 | A  |   | 9/1996  | Endo et al. |
| 5,779,493 | A  | * | 7/1998  | Tomita et al. ................. 439/271 |
| 6,152,752 | A  | * | 11/2000 | Fukuda ......................... 439/275 |
| 6,332,797 | B1 | * | 12/2001 | Taguchi et al. ............... 439/275 |
| 6,517,368 | B2 | * | 2/2003  | Hara et al. .................... 439/271 |

(Continued)

FOREIGN PATENT DOCUMENTS

| DE | 10 2010 034 202 A1 | 3/2011 |
| JP | 63-162470 U | 10/1988 |

(Continued)

OTHER PUBLICATIONS

International Search Report and Written Opinion of the International Search Report for PCT/JP2012/003417 dated Aug. 21, 2012.
Japanese Office Action for the related Japanese Patent Application No. 2011-124047 dated Mar. 3, 2015.

*Primary Examiner* — James Harvey
(74) *Attorney, Agent, or Firm* — Kenealy Vaidya LLP (57) ABSTRACT

A connector comprises a connector housing receiving therein a terminal fitting connected to an electrode of a connector-mounting portion and an electrical wire at an end of which the terminal fitting is provided; a cap for the connector housing; and a packing for the cap. The packing includes a mushroom-like locking projection with an enlarged end portion. The cap includes a locking hole into which the end portion of the locking projection is inserted so that the end portion is placed in locking engagement with the locking hole.

1 Claim, 5 Drawing Sheets

(56) References Cited

U.S. PATENT DOCUMENTS

| | | | |
|---|---|---|---|
| 6,953,357 B2 * | 10/2005 | Fukushima et al. | 439/271 |
| 7,291,036 B1 * | 11/2007 | Daily et al. | 439/487 |
| 2008/0233791 A1 * | 9/2008 | Hanks | 439/427 |
| 2012/0040553 A1 | 2/2012 | Tashiro | |
| 2013/0280950 A1 * | 10/2013 | Becavin | 439/488 |
| 2014/0377978 A1 * | 12/2014 | Okamoto et al. | 439/345 |

FOREIGN PATENT DOCUMENTS

| | | |
|---|---|---|
| JP | 8-298154 A | 11/1996 |
| JP | 2011-34825 A | 2/2011 |
| JP | 2011-70781 A | 4/2011 |

* cited by examiner

CONNECTOR

TECHNICAL FIELD

The present invention relates to a connector that ensures high retentive strength for retention of a packing and visual confirmation of the presence of the packing.

BACKGROUND ART

Electric vehicles and hybrid automobiles incorporate a three-phase AC motor as a power source, and a battery as a source of electrical energy, and an inverter that converts DC power of the battery into three-phase AC power. The three-phase AC motor is connected via the inverter to the battery. The three-phase AC motor is electrically connected via an electrical wire to the inverter. The inverter is electrically connected to the battery via an electrical wire.

Figure 5:
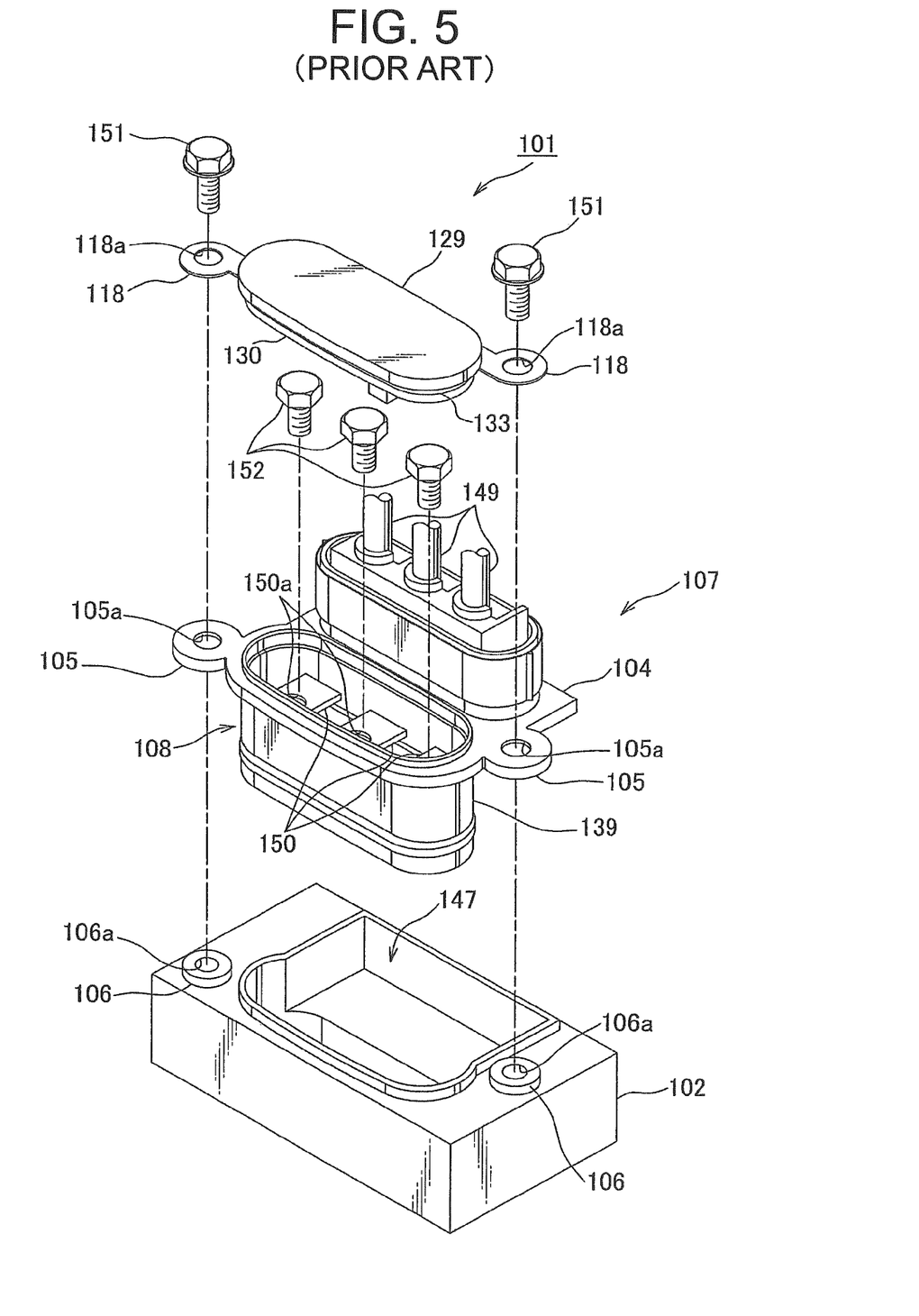
FIG. 5 illustrates a configuration of a conventional connector.

The electrical wire that feeds the three-phase alternate current to the three-phase AC motor is connected via a connector to the inverter, the connector being adapted to be attached to a connector-mounting portion of the inverter. A connector 101 of this type, as shown in FIG. 5, is known, in which an electrical wire 149 along with a terminal fitting 150 provided at an end thereof is received and retained in a shield shell 104, the shield shell 104 being secured by means of a bolt 151 to a connector-mounting portion 102 of an inverter (for example, see the patent literature PTL 1).

The connector 101 as described in the PTL 1 comprises (a) a shield shell 104 including (i) a terminal fitting accommodating portion 108 in which the terminal fitting 150 is received and (ii) an electrical wire accommodating portion 107 in which the electrical wire 149 is received, (b) a bolt 152 that electrically connects a not-shown electrode provided in the connector-mounting portion 102 to the terminal fitting 150 for retention thereof, and (c) a cover member 129 closing the terminal fitting accommodating portion 108, and (d) the bolt 151 adapted to secure the cover member 129 and the shield shell 104 to the connector-mounting portion 102. Also, the cover member 129 includes a packing 133. The packing 133 takes a mushroom-like shape and includes a locking projection adapted to be brought into locking engagement with a recessed portion provided on an outer circumferential surface of the cover member 129.

CITATION LIST

Patent Literature

[PTL 1]
Japanese Patent Application Laid-Open Publication No. 2011-34825

SUMMARY OF INVENTION

Technical Problem

In the state of the art connector 101 as shown in PTL 1, however, the mushroom-like locking projection is caught by the recessed portion to be in locking engagement therewith, so that the packing 133 is retained by the cover member 129. As a result, retentive strength is weak for retention of the locking projection and the recessed portion, and the packing 133 acted upon by an external force may be inadvertently detached from the cover member 129, which is a drawback.

Also, the packing 133 does not have rigidity. The locking projection does not have rigidity, either. As a result, the retentive strength for retention of the locking projection and the recessed portion may be further decreased, which is another drawback.

Further, as the connector 101 is secured to the connector-mounting portion 102, the packing 133 is arranged between the cover member 129 and the terminal fitting accommodating portion 108, so that the packing 133 cannot be visually recognized. As a result, it is not possible to visually confirm the presence of the packing 133, which is still another drawback.

The present invention addresses these problems and provides a solution thereto. Specifically, an object of the present invention is to provide a connector that ensures high retentive force for retention of the packing and visual confirmation of the presence of the packing.

Solution to Problem

In order to solve the problems and attain the objective, a first aspect of the invention provides a connector that comprises (a) a connector housing including a terminal fitting adapted to be connected to an electrode of a connector-mounting portion and an electrical wire at an end of which the terminal fitting is provided; (b) a cap applied to the connector housing and having a locking hole; and (c) a packing applied to the cap. The packing includes a locking projection having a mushroom-like shape with enlarged end portion. The end portion of the locking projection is adapted to be inserted into the locking hole of the cap so that the end portion is brought into locking engagement with the locking hole.

A second aspect of the invention provides the above-defined connector whose locking projection includes a pin member adapted to be inserted in the locking projection.

Advantageous Effects of Invention

In accordance with the first aspect of the invention, the connector has the packing that includes the locking projection in the mushroom-like shape with the enlarged end portion and the cap that includes the locking hole into which the end portion of the locking projection is inserted so that the end portion is brought into locking engagement with the locking hole. Accordingly, it is made possible for the enlarged end portion of the locking projection to be reliably placed in locking engagement with the peripheral portion of the locking hole, which increases the retentive strength of the locking projection with the locking hole for reliable retention of the packing to the cap.

Also, since the connector has the locking projection that is brought into locking engagement with the locking hole in the cap, it is made possible to visually confirm the presence of the packing on the basis of the presence of the end portion of the locking projection that is inserted into and passed through the locking hole so as to protrude to an outside, and thus prevent failure to provide the packing that should exist there.

In accordance with the second aspect of the invention, the connector can increase the stiffness of the locking projection by virtue of the pin member, and thus the retentive strength for retention of the locking projection with the locking hole is substantially increased, making it possible to reliably retain the packing to the cap.

DESCRIPTION OF EMBODIMENTS

Figure 1:
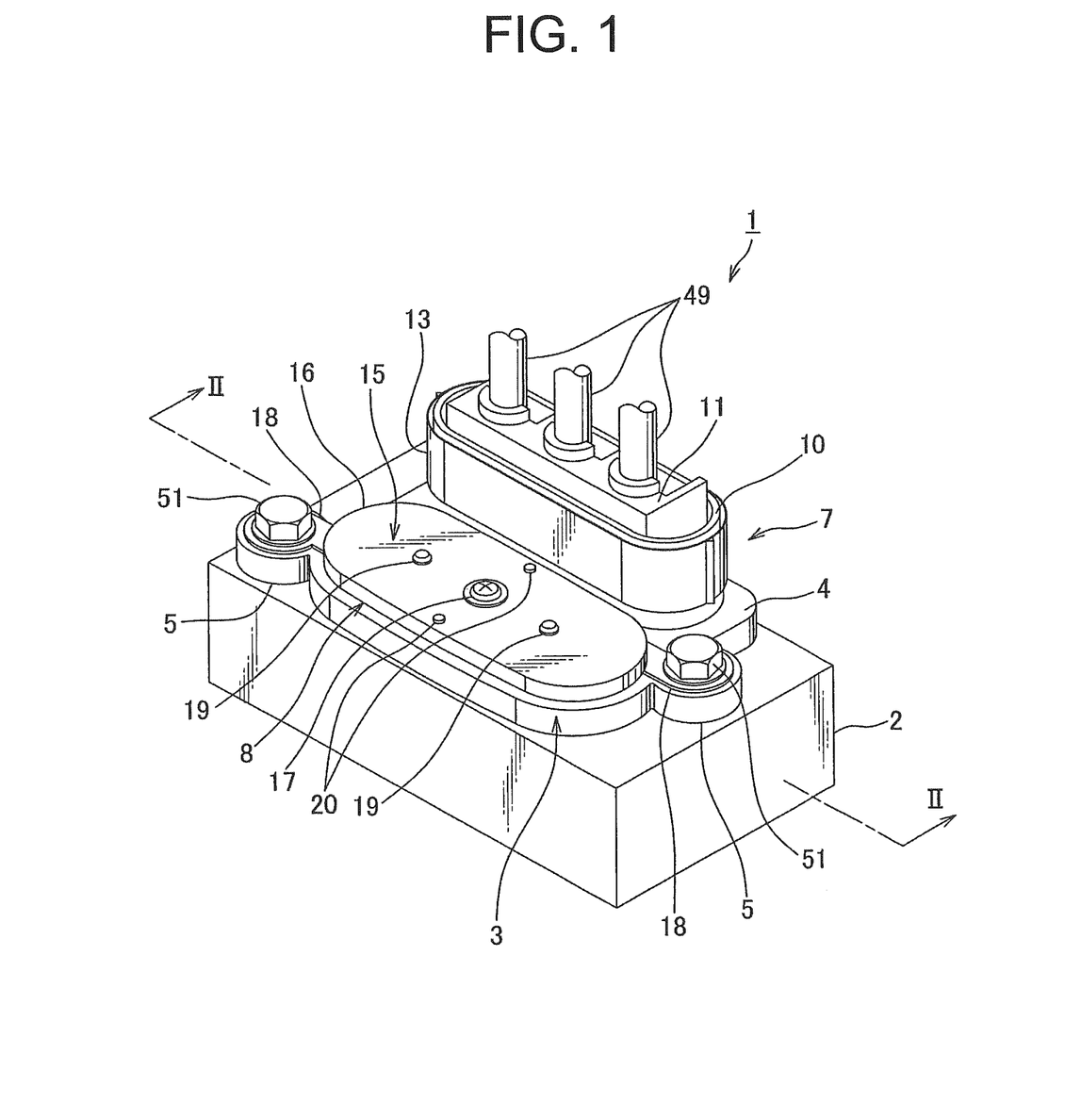
FIG. 1 illustrates a configuration of a connector according to one embodiment of the present invention.

One embodiment of the present invention is described hereinbelow with reference to FIGS. 1 to 4. A connector 1 in accordance with one embodiment of the present invention comprises, as shown in FIG. 1, a connector housing 3 adapted to be attached to a connector-mounting portion 2 of an inverter. The connector 1 in this embodiment is adapted to be attached to the connector-mounting portion 2 provided in a case of the inverter. Meanwhile, it is also contemplated that the connector 1 may be attached to a connector-mounting portion of an electronic component other than such an inverter.

Figure 2:
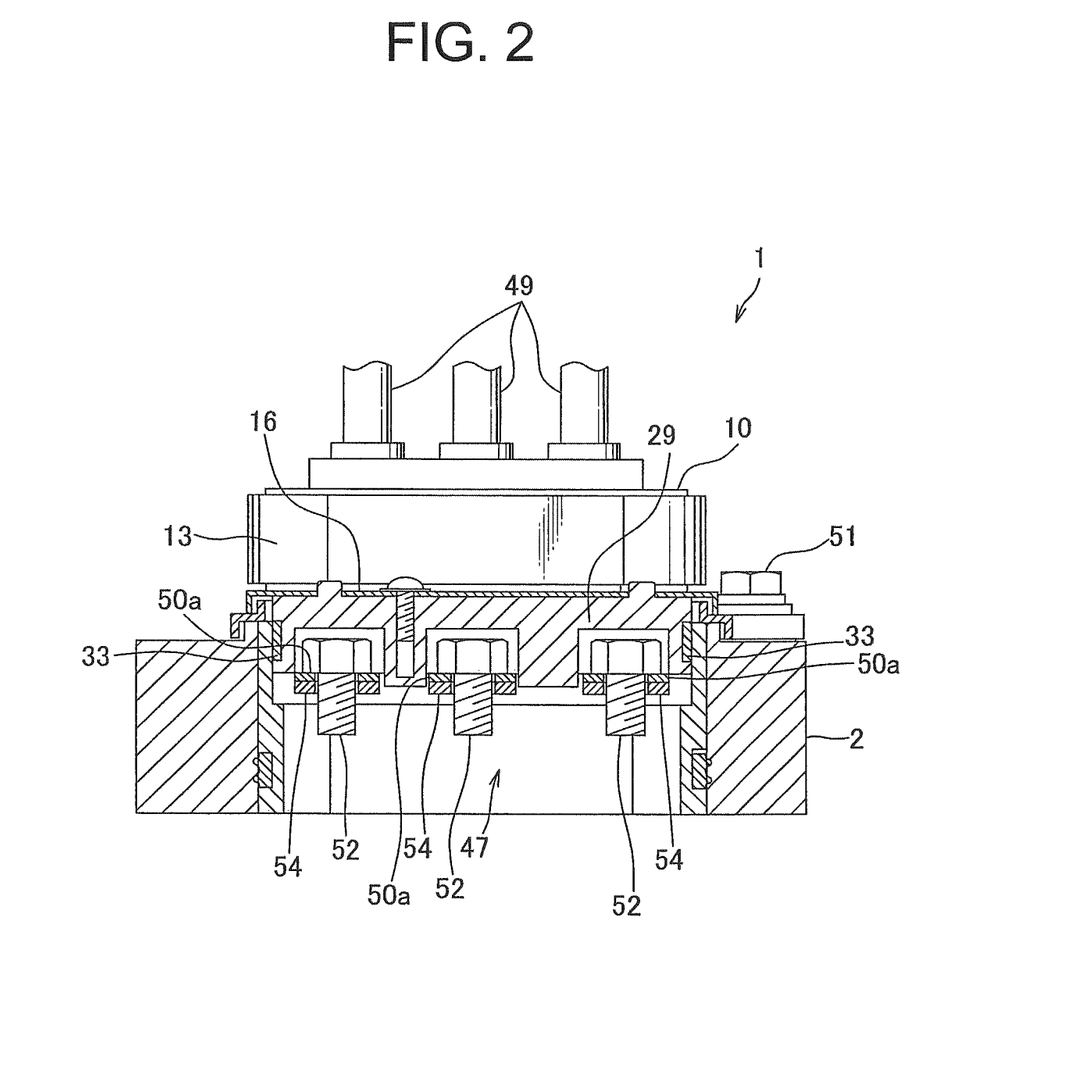
FIG. 2 is a cross-sectional view of the connector of FIG. 1 taken along the line II-II in FIG. 1.
Figure 3:
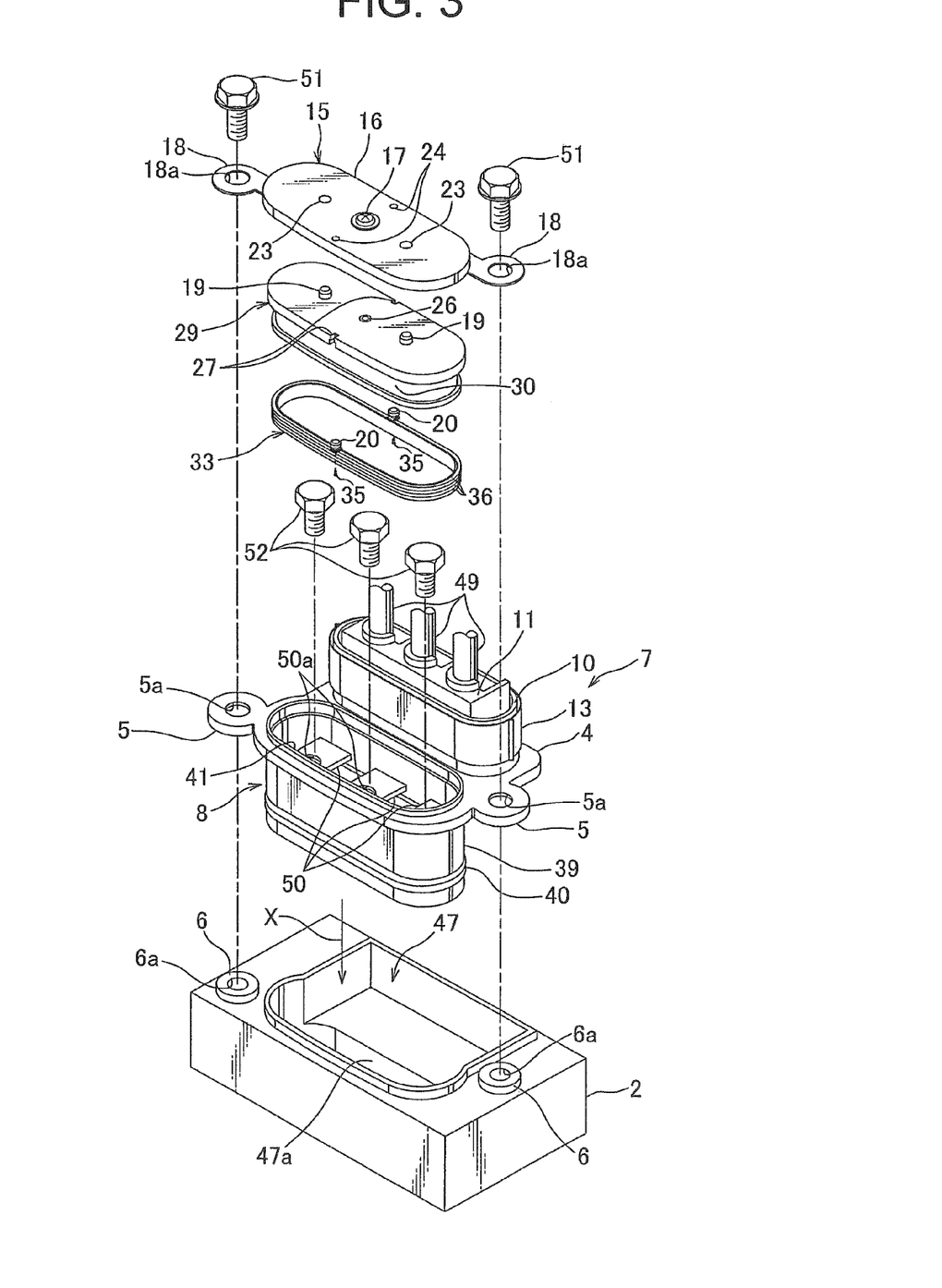
FIG. 3 is an exploded perspective view of the connector of FIG. 1.

The connector housing 3 comprises, as shown in FIGS. 2 and 3, (A) a shield shell 4 serving as an outer housing and (B) an inner housing 11.

The shield shell 4 comprises (a) a terminal fitting accommodating portion 8 in which a terminal fitting 50 is received and (b) an electrical wire accommodating portion 7 in which an electrical wire 49 is received, the electrical wire 49 having the terminal fitting 50 provided at an end thereof. The terminal fitting accommodating portion 8 and the electrical wire accommodating portion 7 are provided in parallel with each other. The shield shell 4 is made of conductive metal such as copper, copper alloy, aluminum and aluminum alloy.

The terminal fitting accommodating portion 8 comprises (i) a cylindrical terminal accommodating space 39 having both ends formed in a shape of an arc, (ii) a packing member 40 provided on and along an outer circumferential surface of the terminal accommodating space 39, (iii) a rib 41 provided at an opening portion of the terminal accommodating space 39 and is formed in a shape of a ring extending along the peripheral portion of the opening portion, and (iv) and a cap 15 provided at the opening portion and adapted to close the opening portion.

A plurality of terminal fittings 50 are arranged in the terminal accommodating space 39 to be spaced from each other at even intervals (three terminal fittings 50 are illustrated in the figure). When the connector 1 is attached to the connector-mounting portion 2 (of the inverter), a plurality of electrodes are arranged in the terminal accommodating space 39, the electrodes being provided in the connector-mounting portion 2 and adapted to be electrically connected to the plurality of terminal fittings 50.

The terminal fittings 50 arranged in the terminal accommodating space 39 are made by press-working of a metal plate made from conductive metal selected from copper, copper alloy, aluminum, and aluminum alloy and subsequent bending of the same metal plate. The terminal fitting 50 comprises (i) an electrode-contacting portion provided in the connector-mounting portion 2 so as to be in contact with the electrode, and (ii) a wire-connecting portion adapted to be connected to an end of the later-described electrical wire 49 by caulking thereto. The terminal fitting 50 takes a shape of an L with the electrical contact portion arranged in the terminal accommodating space 39 substantially orthogonal to the later-described wire-accommodating space 10. The electrical contact portion includes a bolt hole 50a for securing the electrical contact portion to the electrode by means of a bolt 52. The wire-connecting portion includes (i) a core-wire-caulking piece for caulking of the later-described core wire of the electrical wire 49 and (ii) a cover-portion-caulking piece for caulking of the cover portion.

The packing member 40 is made from synthetic rubber having rubber elasticity such as nitrile rubber and is formed in a ring-like manner. The packing member 40 is attached to a recessed groove provided in the outer circumferential surface of the terminal accommodating space 39.

The rib 41 is provided protruding from the peripheral portion of the opening portion of the terminal accommodating space 39 along the peripheral portion thereof in a ring-like manner. The rib 41 has such an amount of protrusion that it is brought into locking engagement with a later-described flange portion 16a of the cover of the cap 15.

The cap 15 comprises a cap body 29, a packing 33 provided on a lateral side of the cap body 29, and the cover 16 adapted to cover a top surface of the cap body 29.

The cap body 29 has an elliptic cylindrical shape having both ends in a shape of an arc. The cap body 29 is provided along the inner circumferential surface of the terminal accommodating space 39. The cap body 29 is made from synthetic resin such as polyvinyl chloride resin. The cap body 29 includes (i) a groove portion 30 provided on the outer circumferential surface for attachment of the later-described packing 33 thereto; (ii) notched portions 27, 27 provided at both ends of the top surface into which locking projections of the packing 33 are each fitted; (iii) protrusions 19, 19 protruding from the top surface and adapted to be inserted into and passed through insertion holes 23, 23 of the later-described cover 16 respectively; and (iv) a screw hole 26 into which a screw member 17 of the cover 16 is screwed.

The groove portion 30 is provided in a shape of a ring extending along the outer circumferential surface of the cap body 29, and a top surface portion and a lower surface portion of the cap body 29 are enlarged. The top surface portion is more enlarged than the lower surface portion.

Figure 4:
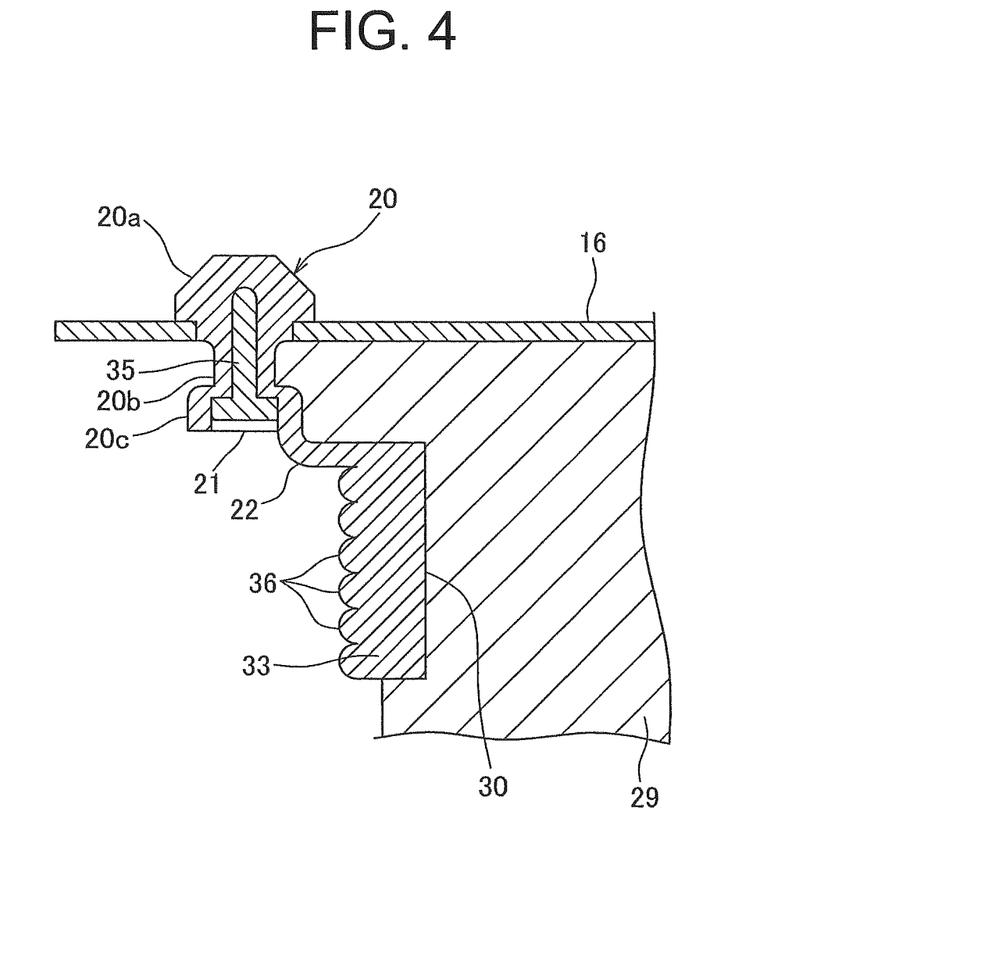
FIG. 4 is an enlarged cross-sectional view of a principal part for illustration of the state of locking engagement between a packing and a cap.

The notched portions 27, 27 are, as shown in FIGS. 3 and 4, provided corresponding to the outer shape of the locking projections 20 of the packing 33. The notched portions 27, 27 each include a small-diameter portion adapted to be brought into abutment on the column portion 20b of the later-described locking projection 20, and a large-diameter portion adapted to be brought into abutment on the base portion 20c of the locking projection 20, the small-diameter portion continuing to the large-diameter portion.

The protrusions 19, 19 are arranged spaced from each other in the longitudinal direction of the cap body 29 (two protrusions are illustrated in the figure). The protrusions 19, 19 each include a tapering surface whose end portion is tapered.

The screw hole 26 is provided in the centre of the top surface of the cap member 29. The screw hole 26 is threaded in accordance with the screw member 17.

The packing 33 has a ring shape slightly smaller than the outer shape of the groove portion 30 provided in the outer circumferential surface of the cap body 29. The thickness of the packing 33 is defined such that the inner circumferential surface of the terminal accommodating space 39 and the inner circumferential surface of the rib 41 are pressed by the packing 33 so that they are in firm contact with the packing 33 when the packing 33 is attached to the groove portion 30 and the terminal fitting accommodating portion 8 is closed by the cap body 29. The packing 33 includes a protruding portions 36 provided on the lateral side thereof and a locking projection 20 provided at the upper peripheral edge portion.

The protruding portions 36 are provided in a shape of a ring on and along the peripheral surface of the packing 33. Six protruding portions 36 are illustrated in the figure.

The locking projections 20 are provided at the upper peripheral edge of the packing 33 (two locking projections 20 are illustrated in the figure). The locking projections 20 are each provided at opposite positions at the peripheral edge portion on the circumferential surface of the packing 33. The locking projections 20 protrude to an extent that it is more elevated than the peripheral edge portion. The locking projections 20 each include a connecting portion 22 substantially orthogonal to the outer circumferential surface of the packing 33 and extended in the direction away from the outer circumferential surface; a base portion 20c provided at the connecting portion 22; a column portion 20b extended from the base portion 20c in the direction orthogonal to the direction in which the connecting portion 22 is extended; and an end portion 20a provided at the end of the column portion 20b with an enlarged width so that the locking projection 20 as a whole takes a mushroom-like shape. The locking projections 20 each include an intrusion hole 21 into which a later-described pin member 35 is fitted, the intrusion hole 21 extending from the base portion 20c through to the end portion 20a.

The base portion 20c has such a large width that the base portion 20c is allowed to be brought into abutment on the wide portion of the pin member 35 and thereby accommodate the wide portion therein. The column portion 20b has such a small diameter that the column portion 20b is allowed to press the inside of the notched portion 27 of the cap body 29. The end portion 20a has such a large diameter that the end portion 20a presses the inner circumferential surface of the locking hole 24 of the cover 16 and is brought into locking engagement with the peripheral edge portion of the locking hole 24. In this manner, the retentive strength for retention of the locking projection 20 with the locking hole 24, and the retentive strength for retention of the locking projection 20 with the notched portion 27 are increased.

The pin member 35 is made from synthetic resin having stiffness such as polyvinyl chloride resin. The pin member 35 includes a pin portion adapted to be fitted in the intrusion hole 21, and the wide portion adapted to be brought into abutment on the intrusion hole 21 at the base portion 20c thereof. Accordingly, by virtue of the pin member 35 fitted in the intrusion hole 21, the stiffness of the locking projection 20 is substantially increased, and the retentive strength for retention of the locking projection 20 with the locking hole 24 as well as the retentive strength for retention of the locking projection 20 with the notched portion 27 are substantially increased.

The cover 16 is, as shown in FIGS. 2 and 3, slightly larger than the top surface of the cap body 29, and takes a shape of a thin elliptical plate corresponding to the shape of the top surface. The cover 16 is made from conductive metal. The cover 16 includes (i) a flange portion protruding from the peripheral edge portion of the cover 16; (ii) insertion holes 23, 23 into each of which the protrusions 19 of the cap body 29 are inserted to be passed therethrough, respectively; (iii) locking holes 24, 24 into each of which the locking projections 20 of the packing 33 are inserted to be brought into locking engagement therewith, respectively; (iv) a screw member 17 adapted to be screwed into the screw hole 26 of the cap body 29; and (v) bolt-mounting pieces 18, 18 adapted for attachment of the cover 16 and the shield shell 4 by means of the bolt 51 to the connector-mounting portion 2 (of the inverter).

The flange portion is adapted to be arranged upon the outer circumferential surface of the rib 41 of the terminal accommodating space 39 when the terminal fitting accommodating portion 8 is closed by the cover 16. The flange portion protrudes to an extent larger than the amount of protrusion of the rib 41.

The insertion holes 23 are arranged spaced from each other in the longitudinal direction of the cover 16 (two insertion holes 23 are illustrated in the figure). The insertion holes 23 are each provided at positions corresponding to the protrusions 19, 19 of the cap body 29.

The locking holes 24 are provided spaced from each other in a direction orthogonal to the longitudinal direction of the cover 16 (two holes 24 are illustrated in the figure). The locking holes 24 are provided at positions corresponding to the locking projections 20, 20 of the packing 33, respectively. The locking hole 24 has, as shown in FIG. 4, a hole diameter slightly smaller than the end portion 20a of the locking projection 20, but slightly larger than the column portion 20b of the locking projection 20.

The screw member 17 is made of metal and provided at the centre of the cover 16 such that it is arranged at a position corresponding to the screw hole 26 of the cap body 29.

The bolt-mounting pieces 18, 18 are provided, as shown in FIGS. 2 and 3, extended from the flange portion in the longitudinal direction of the cover 16. The bolt-mounting pieces 18, 18 each include a mounting hole 18a into which the bolt 51 is inserted, the bolt 51 being for use in securing the cover 16 and the shield shell 4 to the connector-mounting portion 2.

The electrical wire accommodating portion 7 comprises (i) a wire-accommodating space 10, (ii) an inner housing 11 fitted in the wire-accommodating space 10, and (iii) a shielding member 13 provided on the outer circumferential surface of the wire-accommodating space 10.

The wire-accommodating space 10 has a shape of a cylinder with both ends in a shape of an arc. The wire-accommodating space 10 is slightly smaller than the terminal fitting accommodating space 39. The wire-connecting portion of the terminal fitting 50 and the electrical wire 49 caulked by the wire-connecting portion are received in the wire-accommodating space 10.

There are provided three electrical wires 49 that are to be received in the wire-accommodating space 10 to supply three-phase AC power to the motor. The electrical wire 49 includes a conductive core wire and an insulating cover portion. The core wire is obtained by twisted conductors made from conductive metal such as copper, copper alloy, aluminum, or aluminum alloy. The cover portion is made from insulating synthetic resin such as polyvinyl chloride resin and covers the core wire. It is contemplated that the core wire may comprise a single core wire.

The inner housing 11 is made of insulating synthetic resin such as polyvinyl chloride resin. The inner housing 11 includes (i) a recessed groove that retains the three electrical wires such that they are spaced from each other, (ii) a locking feature adapted to be engagement with the wire-accommodating space 10 inside thereof, and (iii) a waterproof feature adapted to prevent entry of liquid such as water into the wire-accommodating space 10. Thus, the three electrical wires are retained spaced from each other by virtue of the inner housing 11, and the three electrical wires are retained by the wire-accommodating space 10. It is contemplated that the locking feature may comprise, as one example, a recessed engagement portion provided in the wire-accommodating space 10 and an engagement projection provided in the inner housing 11. It is also contemplated that the waterproof feature may comprise, as one example, a packing member such as a rubber packing.

The shielding member 13 is made from conductive metal such as copper, copper alloy, aluminum, and aluminum alloy and is formed in a shape of a ring extending along the outer shape of the wire-accommodating space 10. The shielding member 13 is in fitting engagement with the outer circumferential surface of the wire-accommodating space 10 and secured thereto.

The following describes how to assemble the connector 1 having the above-defined configuration. The connector 1 is, as shown in FIG. 3, assembled by bringing together the constituent parts in the assembling direction X. More specifically, the terminal fitting 50, which is provided at the end of the electrical wire 49, is received in the terminal fitting accommodating space 39; the electrical wire 49 is received in the wire-accommodating space 10; the shielding member 13 is brought into fitting engagement with the outer circumferential surface of the wire-accommodating space 10; the inner housing 11 is brought into fitting engagement with the wire-accommodating space 10; and the electrical wire 49 is secured in position.

Next, the shield shell 4 is attached to the connector-mounting portion 2 of the inverter. At this point, the terminal fitting accommodating space 39 is received in the inner bottom portion 47a of the accommodating portion 47 of the connector-mounting portion 2, and the terminal fittings 50 in the terminal fitting accommodating space 39 are brought into abutment on the electrodes of the connector-mounting portion 2, respectively.

Next, the bolt 52 is inserted in and passed through the bolt hole of the electrical contact portion of the terminal fitting 50, and the bolt 52 is screwed into the electrode, so that the electrode is electrically connected to the terminal fitting 50.

Next, the cover 16 is put on the top surface of the cap body 29 to cover it, and the screw member 17 is screwed into the screw hole 26. Next, the packing 33 is attached to the outer circumferential surface of the cap body 29, and the locking projection 20 is fitted in (a) the notched portion 27 of the cap body 29 and (b) the locking hole 24 of the cover 16. At this point, as shown in FIG. 4, the end portion 20a of the locking projection 20 protrudes from the cover 16, the end portion 20a is brought into locking engagement with the peripheral portion and the inner circumferential surface of the locking hole 24, and the column portion 20b of the locking projection 20 is brought into locking engagement with the notched portion 27. At this point, the presence of the packing 33 in position can be visually confirmed on the basis of the presence of the end portion 20a of the locking projection 20 protruding from the cover 16.

Next, as shown in FIG. 3, the pin member 35 is fitted in the intrusion hole 21 of the locking projection 20 and the cap 15 is constructed. At this point, stiffness of the locking projection 20 is substantially increased and thereby the retentive strength is substantially increased.

Next, the opening portion of the terminal fitting accommodating space 39 of the shield shell 4 is closed by the cap 15; the bolt 51 is inserted into and passed through (a) the mounting hole 18a of the bolt-mounting piece 18 of the cap 15 and (b) the mounting hole 5a of the bolt mounting portion 5 of the shield shell 4; the bolt 51 is screwed into the bolt hole 6a of the bolt bearing portion 6 of connector-mounting portion 2; and the connector 1 is secured to the connector-mounting portion 2. At this point, the presence of the packing 33 in position can be visually confirmed by visually confirming the presence of the locking projection 20 of the packing 33 protruding from the cover 16.

As the state of attachment of the packing 33 is visually confirmed, the connector 1 is manufactured that in a proper manner have the locking projection 20 protruding from the cover 16 of the cap 15.

In accordance with this embodiment, the connector 1 comprises the terminal fitting 50 adapted to be connected to the electrode of the connector-mounting portion 2; the connector housing 3 adapted to receive therein the electrical wire 49 at the end of which the terminal fitting 50 is provided; the cap 15 provided in the connector housing 3; and the packing 33 provided in the cap 15. The packing 33 includes the locking projection 20 having the mushroom-like shape with the enlarged end portion 20a. The cap 15 includes the locking hole 24 adapted to be brought into locking engagement with the end portion 20a of the locking projection 20 inserted therein and passed therethrough.

By virtue of this configuration, the connector 1 has the packing 33 that includes the mushroom-like locking projection 20 with the enlarged end portion 20a, and has the cap 15 that includes the locking hole 24 adapted to be brought into locking engagement with the end portion 20a with the end portion 20a of the locking projection 20 inserted therein and passed therethrough. Accordingly, the enlarged end portion 20a of the locking projection 20 is effectively placed in locking engagement with the peripheral portion of the locking hole 24, and the retentive strength for retention of the locking projection 20 with the locking hole 24 is increased, making it possible to reliably retain the packing 33 to the cap 15.

Also, the connector 1 allows for visual confirmation of the presence of the packing 33 provided in the cap 15 on the basis of the presence of the end portion 20a of the locking projection 20 that is inserted in and passed through the locking hole 24 and thus protrudes to the outside, for the locking projection 20 is brought into locking engagement with the locking hole 24 of the cap 15. Accordingly, it is made possible to prevent failure to provide the packing 33 that should exist there.

Further, in accordance with this embodiment, the locking projection 20 of the connector 1 includes the pin member 35 adapted to be inserted into the locking projection 20.

By virtue of this configuration, the connector 1 allow for substantial increase in the stiffness of the locking projection 20 by the presence of the pin member 35. Accordingly, the retentive strength for retention of the locking projection 20 with the locking hole 24 is substantially increased, making it possible to reliably retain the packing 33 to the cap 15.

It is appreciated that the embodiment described herein is a representative one taken from among conceivable embodiments of the invention, and that the invention is in no way limited to the illustrated embodiments. Rather, the invention can be implemented with various modifications made thereto within the range that the spirit of the invention is deviated from.

REFERENCE SIGNS LIST

1 Connector
2 Connector-mounting portion
3 Connector housing
4 Shield shell
7 Electrical wire accommodating portion
8 Terminal fitting accommodating portion
15 Cap
16 Cover
20 Locking projection
20a End portion
24 Locking hole
27 Notched portion

29 Cap body
33 Packing
35 Pin member
49 Electrical wire
50 Terminal fitting

The invention claimed is:

1. A connector comprising:
a connector housing including a terminal fitting adapted to be connected to an electrode of a connector-mounting portion and an electrical wire at an end of which the terminal fitting is provided;
a cap applied to the connector housing and having a locking hole; and
a packing applied to the cap, the packing including a locking projection having a mushroom-like shape with enlarged end portion, the end portion of the locking projection being adapted to be inserted into the locking hole of the cap so that the end portion is brought into locking engagement with the locking hole,
wherein the locking projection includes a pin member adapted to be inserted in the locking projection.

* * * * *